Nov. 10, 1931.  E. H. L. ENGLUND  1,831,294

STREET INDICATOR

Filed March 25, 1931  2 Sheets-Sheet 1

Inventor
E. H. L. Englund
By C. A. Snow & Co.
Attorneys

Nov. 10, 1931.  E. H. L. ENGLUND  1,831,294
STREET INDICATOR
Filed March 25, 1931    2 Sheets-Sheet 2
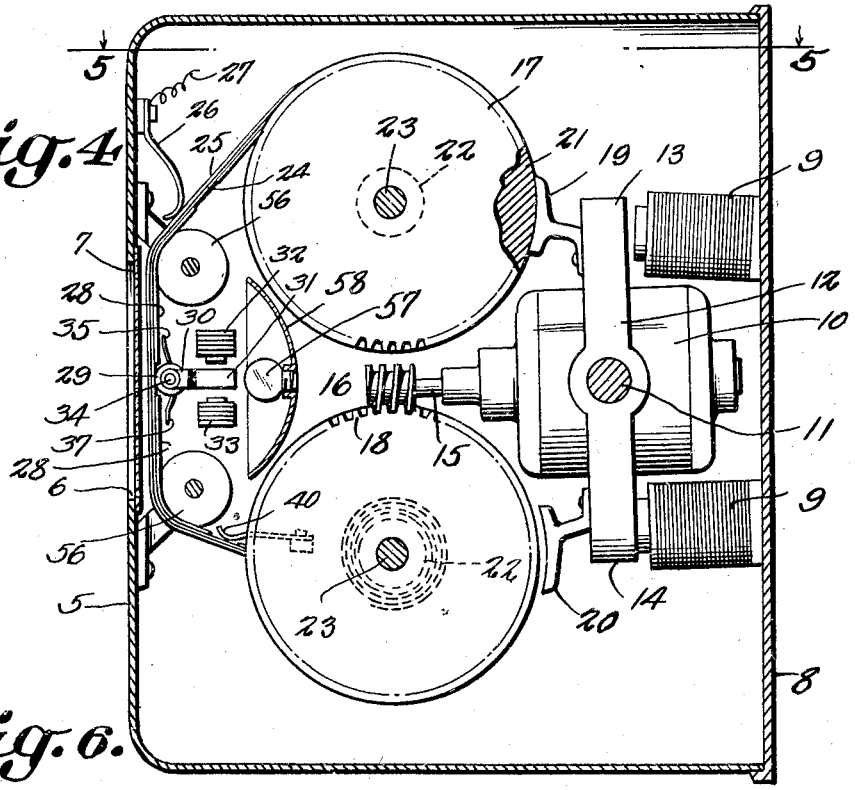
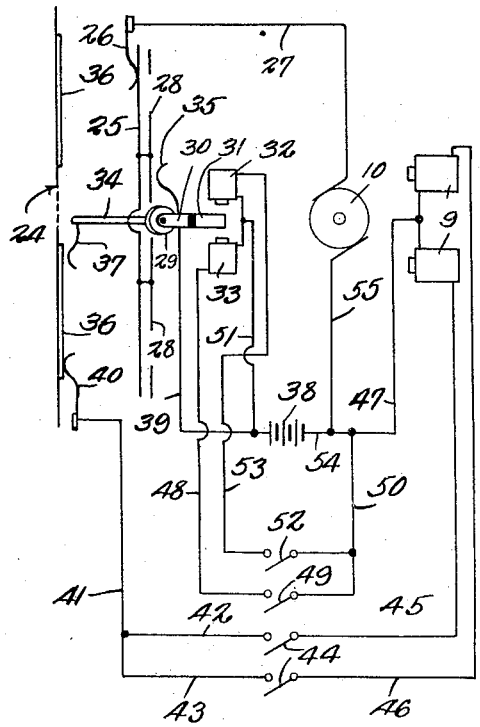
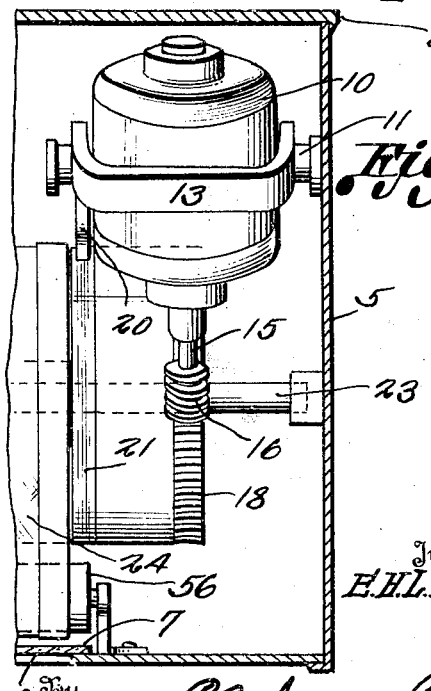
Inventor
E. H. L. Englund
By
C. A. Snow & Co.
Attorneys Patented Nov. 10, 1931

1,831,294

UNITED STATES PATENT OFFICE

EDWIN H. L. ENGLUND, OF MUSKEGON HEIGHTS, MICHIGAN, ASSIGNOR OF ONE-TWENTIETH TO CLIFFORD H. ANDERSON, ONE-TWENTIETH TO GARFIELD C. ANDERSON, AND ONE-TWENTIETH TO BENJAMIN BRAUER, OF MUSKEGON HEIGHTS, MICHIGAN

STREET INDICATOR

Application filed March 25, 1931. Serial No. 525,287.

This invention relates to street indicators designed for use in buses, street cars or other public conveyances, the primary object of the invention being to provide a device to be supported within the vehicle, in full view of the passengers, to indicate successively, the streets or stops along the route of the vehicle.

An important object of the invention is to provide an electrically controlled means for moving an endless translucent web before a display opening, the web being supplied with indicia indicating the names of the streets, which will be clearly visible at night, when light rays are projected therethrough.

A still further object of the invention is to provide a device of this character controlled by a switch located near the driver of the vehicle, the construction of the device being such that the web may be readily reversed, when the route terminal has been reached, thereby providing a continuously operated indicator.

With the foregoing and other objects in view, which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawings:

Figure 4 is a sectional view through the indicator housing.

Figure 5 is a fragmental sectional view taken approximately on line 5—5 of Figure 4.

Figure 6 is a diagram indicating the electric circuits.

Figure 1:
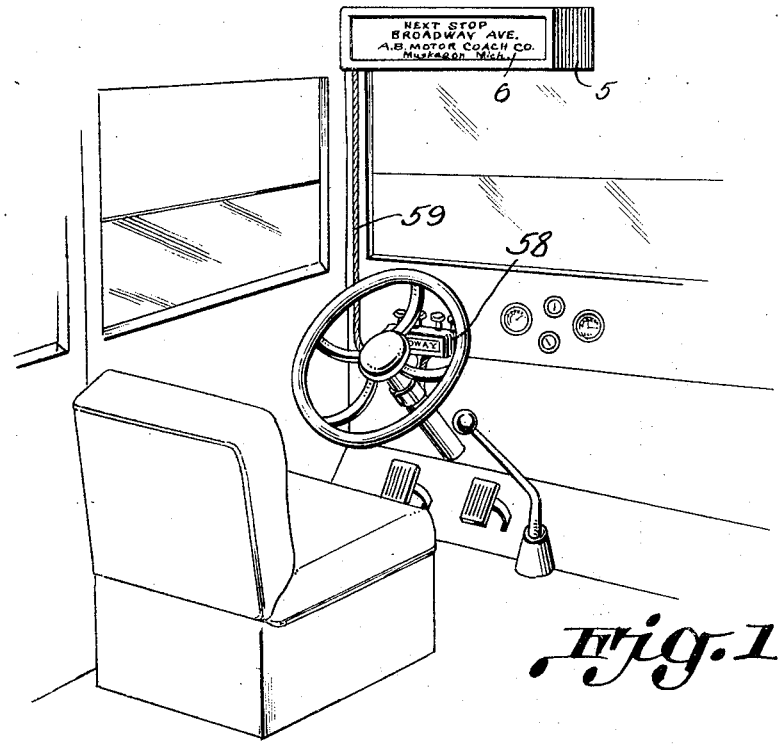
Figure 1 is a perspective view illustrating an indicating device constructed in accordance with the invention, as positioned within a bus.
Figures 2, 3:
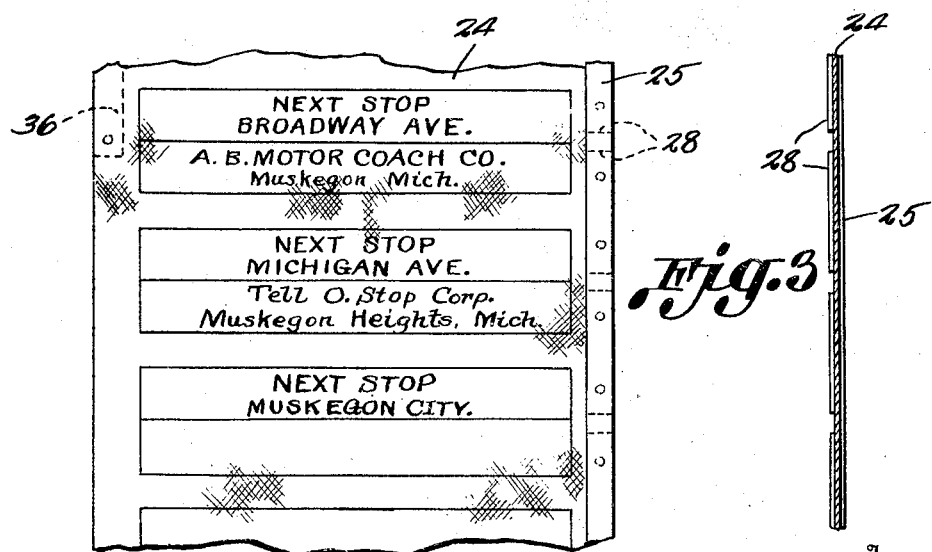
Figure 2 is a fragmental elevational view of the web, forming a part of the indicator.
Figure 3 is a sectional view taken on line 3—3 of Figure 1.

Referring to the drawings in detail, the device comprises a box-like body portion 5 which is provided with a display opening 6 formed in the front wall thereof, which opening is covered by the member 7, which is constructed of translucent material.

The rear of the body portion is closed by means of the cover plate 8, which also provides a support for the magnets 9, that are shown as extending inwardly therefrom. The reference character 10 designates a motor, which is provided with lateral shafts 11, that have connection with the bar 12, the ends of which bar provide the armatures 13 and 14 respectively, that cooperate with the magnets 9. Thus it will be seen that due to this construction, the armatures may be attracted, to tilt the motor 10, for purposes to be hereinafter more fully described.

The armature shaft of the motor, which is indicated by the reference character 15, extends forwardly from the motor, and is provided with a worm 16, adapted to mesh with the gears 17 and 18 respectively, formed at the ends of the spools, to be hereinafter more fully described.

Carried by the bar 12, are brake shoes 19 and 20 respectively, which brake shoes are adapted to engage the brake bands 21 of the spools, in a manner as shown by Figure 4, so that overrunning of the spools will be prevented, when the web is stopped before the display opening. The spools which are indicated by the reference character 22, are mounted on the shafts 23 that are journaled in suitable bearings formed in the sides of the body portion 5.

The reference character 24 designates the web, which is wound on the spools, and is transferred from one spool to the other, during the operation of the device. This web 24 is formed of translucent material, so that light rays may be projected therethrough to illuminate the indicia thereon, rendering the sign clearly visible at night. Secured along the outer surface of the web 24, at a point adjacent to one edge thereof, is a contact strip 25, which is engaged by the contact arm 26, which is shown as secured within the body portion, the contact arm 26 being in circuit with the motor 10, through the wire 27. Secured along the rear surface of the web and disposed in spaced relation with each other, are contact plates 28, the spaces between adjacent ends of the contact plates 28, being of widths to accommodate the roller 29 that is mounted at one end of the arm 30. The inner end of the arm, which is indicated by the reference character 31, constitutes an armature to be attracted by the magnets 32 and 33 respectively.

The roller 29 is mounted on the shaft 34, to which the contact finger 35 is secured, the finger 35 extending beyond the roller 29, where it normally lies in spaced relation with the contact plates 28, as clearly shown by Figure 4 of the drawings. The shaft 34 is substantially long and extends across the web, the free end of the shaft terminating at a point near the opposite side edge of the web 24, where it is disposed in spaced relation with the contact strips 36 secured near the ends of the web 24.

Extending from the free end of the shaft 34, is a contact finger 37 that rocks with the shaft, to the end that when the magnet 33 is energized, the armature 31 is drawn into engagement with the magnet 33, rocking shaft, and causing the contact finger 37 to engage the contact strip 36, over which the contact finger is resting. This contact finger 37 is in circuit with the battery 38, through the wire 39, which has connection with the shaft 34. When the finger 37 engages the contact strip 36, the circuit is completed to one of the magnets 9, the circuit being completed through the contact arm 40, contact wire 41, wires 42 and 43, switch members 44, wires 45 and 46, which are shown as connected with the magnets 9. The return circuit is made through the wire 47. Thus it will be seen that by pressing either of the switch members 44, the circuit will be completed, to energize one of the magnets 9. It follows that the worm gear 16 is now moved into engagement with one of the gears 17 or 18, to rotate the spools and cause the web to move before the display opening. It will of course be understood that the contact finger 37 is moved into engagement with a contact strip 36, only after the circuit to the magnet 33 has been completed, the circuit to the magnet 33 being made through the wire 48, switch member 49, wire 50, battery 38, and wire 51.

The contact finger 35 is moved into engagement with the contact plates 28, only when the circuit has been completed to the magnet 32, which is accomplished by operating the switch 52, which is in circuit with magnet 32, through wire 53, wire 50, wire 54, battery 38 and wire 51. It will of course be understood that the switch members will be so arranged that they may be readily controlled by the operator. Simultaneously with the operation of the magnet 32, the motor 10 is put in motion by the electric current passing through the wires 55 and 27.

In order that the web will be stretched across the display opening in such a way that the web will lie flat, guide rolls 56 are provided, which guide rolls are suitably spaced from the display opening, to permit of free passage of the web therebetween. The interior of the body portion is illuminated by the lamp 57, which is mounted within the reflector 58, so that the light rays are projected forwardly through the web.

The operation of the device is as follows:

With the motor set as shown by Figure 4, the operator of the vehicle presses the switch 52, closing the circuit to the magnet 32, resulting in the armature 31 being drawn towards the magnet 32. The contact finger 35 moves with the armature 31 and engages one of the contact plates 28. When the contact finger 35 engages a contact plate, the circuit is completed to the motor, through the contact arm 28, wire 26, wire 55, battery 38 and wire 39. The motor is set into operation which causes the spool 18 to wind the web. As the web is fed onto the spool 18, the roller 29 moves into engagement with the contact plate directly thereover, elevating the contact finger 35.

The circuit is now made through the roller, until the roller moves into the space between the adjacent ends of the plate. When it is desired to again move the web to display the name of the next street, this action is repeated. When the movement of the web is to be reversed, the switch member 44 is actuated, completing the circuit to the opposite magnet 9, through the wires 46 and 47, battery 38, wire 39, shaft 34, finger 37 and contact strip 36, back through the finger 40, wire 41 and wire 43. It will of course be understood that prior to the operation of the switch 44, the switch 49 is operated to complete the circuit to the magnet 33, to move the shaft 34 and finger 37, causing the finger 37 to engage the contact strip 36.

It might be further stated that the switches are arranged within the switch box 58 secured to the steering post of the vehicle, and that mechanical means is provided within the switch box, for displaying the name of a street, corresponding to the name displayed by the web 24, to the end that the operator may tell at a glance whether or not the name of the proper street, is being displayed. The wires leading from the switches to the various elements of the street indicator, pass through the cable 59.

I claim:

1. In a device of the class described, a body portion, a web carrying indicia thereon, operating within the body portion, spools on which the web is wound, a motor, means for transmitting movement of the motor to the spools, contact plates on the web, wires providing a circuit between the contact plates and motor, a movable contact member, and electrical means for operating the movable contact member to complete a circuit to the motor to operate the spools.

2. In a device of the class described, a body portion having a display opening, spools operating in the body portion, a web wound on the spools and carrying indicia, a motor for operating the spools, contact plates on the web, wires providing a circuit between the contact plates and the motor, a movable contact member supported adjacent to the strip and adapted to move to engage the contact plates to complete a circuit to the motor, means for transmitting movement of the motor to the spools to move the web before the display opening, and electrically controlled means for operating the contact member.

3. In a device of the class described, a body portion having an opening, spools operating within the body portion, a web wound on the spools and carrying indicating characters, said web adapted to move before the opening to display indicating characters thereon, contact members on the web, a motor, means for providing a circuit between the contact members of the web and the motor, to operate the motor, and means for transmitting movement of the motor to the spools, to move the web.

4. In a device of the class described, a body portion, said body portion having an opening, spools mounted for rotary movement within the body portion, a web wound on the spools and adapted to move in front of the opening to display the names of streets appearing on the web, a plurality of contact plates arranged in spaced relation with each other and disposed along the web, near one edge thereof, a motor, means for transmitting movement of the motor to the spools to operate the web, movable contact members, wires for providing the circuit between the contact member and motor, and means for operating the contact member to move the contact member into engagement with the contact plates, to complete the circuit to the motor.

5. In a device of the class described, a body portion, said body portion having a display opening, spools operating within the body portion, a web wound on the spools, a plurality of contact plates positioned on the web, and arranged in spaced relation with respect to each other, a motor, means for transmitting movement of the motor to the spools to wind the web on one of the spools, a contact member normally lying within the space between adjacent plates, a contact member extending forwardly from the first mentioned contact member and lying in spaced relation with the plate disposed thereunder, means for operating the first mentioned contact member to cause the second mentioned contact member to engage a plate, wires for providing a circuit between the plates and motor, and said roller adapted to move onto a plate, to complete the circuit to the motor.

6. In a device of the class described, a body portion having a display opening, spools mounted within the body portion, an electric motor for operating the spools, a web wound on the spools, an electric motor for operating the spools to move the web before the display opening to display indicia on the web, spaced contact plates on the web, a wire providing a circuit between the contact plates and the motor, a pivoted contact member within the body portion, a wire providing a circuit between the pivoted contact member and the motor, and electrically controlled means for moving the pivoted contact member to complete a circuit, to operate the motor and spools.

In testimony that I claim the foregoing as my own, I have hereto affixed my signature.

EDWIN H. L. ENGLUND.